United States Patent [19]
Sato et al.

[11] Patent Number: 5,931,367
[45] Date of Patent: Aug. 3, 1999

[54] REMOVABLE BONDING WORKING PORTIONS FOR AN ULTRASONIC WELDER

[75] Inventors: Shigeru Sato; Mitsugu Katsumi; Seiya Nakai, all of Fukuoka-ken, Japan

[73] Assignee: Ultex Corporation, Fukuoka, Japan

[21] Appl. No.: 08/856,583

[22] Filed: May 15, 1997

[30] Foreign Application Priority Data

Aug. 8, 1996 [JP] Japan ...................................... 8-210099

[51] Int. Cl.⁶ ......................... B23K 1/006; B32B 31/000
[52] U.S. Cl. ......................................... 228/1.1; 156/580.1
[58] Field of Search ................................ 228/1.1, 110.1; 156/580.2, 580.1, 73.1; 425/174.2

[56] References Cited

U.S. PATENT DOCUMENTS

| | | | |
|---|---|---|---|
| 3,752,380 | 8/1973 | Shoh | 228/1 |
| 3,966,520 | 6/1976 | Fallenbeck et al. | 156/73.1 |
| 4,208,001 | 6/1980 | Martner | 228/1.1 |
| 4,499,845 | 2/1985 | Pope | 116/137 |
| 4,582,239 | 4/1986 | Scotto | 228/1.1 |
| 4,852,788 | 8/1989 | Partrikos | 228/110 |
| 5,197,651 | 3/1993 | Nakamura et al. | 228/44.7 |
| 5,368,216 | 11/1994 | Sakakura et al. | 228/1 |
| 5,421,923 | 6/1995 | Clarke et al. | 156/73.1 |
| 5,730,832 | 3/1998 | Sato et al. | 156/499 |

FOREIGN PATENT DOCUMENTS

| | | |
|---|---|---|
| 5548946 | 4/1980 | Japan . |
| 2121830 | 5/1990 | Japan . |
| 2-32077 | 7/1990 | Japan . |
| 6155051 | 3/1994 | Japan . |

OTHER PUBLICATIONS

Merriam Webster's Collegiate Dictionary, Tenth ed., pg. 129, 1997.

*Primary Examiner*—Patrick Ryan
*Assistant Examiner*—Carlos J. Gamino
*Attorney, Agent, or Firm*—Kanesaka & Takeuchi

[57] ABSTRACT

A resonator for an ultrasonic bonding apparatus, which comprises an ultrasonic horn having a recessed portion in the exterior surface and a threaded hole, a bonding working portion having a chip base fitted in the recessed portion and a chip body provided on the chip base, and a screw member having a screw portion to fit into the threaded hole and a through-hole through which the chip body is put without contact with said screw member so that the screw member is screwed into the threaded hole, the bonding portion is fixed to the ultrasonic horn, with the chip body projecting through the through-hole for contact with a workpiece.

12 Claims, 12 Drawing Sheets

REMOVABLE BONDING WORKING PORTIONS FOR AN ULTRASONIC WELDER

BACKGROUND OF THE INVENTION

1. Field of the Invention

The present invention relates to resonators for an apparatus for bonding members together with ultrasonic vibration.

2. Description of the Prior Art

Japanese Patent Application Kokai No. 54-13349 discloses an ultrasonic vibration bonding machine for bonding workpieces held between a mount and a resonator which is connected to a transducer.

The resonator comprises an ultrasonic horn made from aluminum, iron, or titanium. A primary product is machined to a shape and size which are determined by the material, thickness, and shape of the members to be bonded and an oscillation output of the transducer. The primary product is then connected to the transducer for vibration. In order to provide the desired resonance, the primary product is subjected to secondary processing to adjust the length and thickness of the primary product for fine tuning. When the bonding working portion of the ultrasonic horn is brought into contact with the overlapped workpieces and an ultrasonic wave is supplied, the bonding working portion is worn down by diffusion caused by bonding temperatures. If the surface of the bonding working portion becomes rough by repetition of such abrasion or diffusion, a bonding failure of the workpieces can take place or a bonding flaw can be made on the surface of a workpiece, resulting in the poor quality and low reliability. Therefore, it is necessary to polish the surface of the bonding working portion for repair. However, the ultrasonic horn must be removed from the resonator to repair the bonding working portion. The assembly and tuning of the resonator require a considerable amount of time and labor. In addition, the polishing margin of the bonding working portion is so small to provide an appropriate resonance that the bonding working portion cannot be used after several times of repair, and the old ultrasonic horn must be replaced with a new one. Since the ultrasonic horn must be replaced with a new one when the bonding working portion is worn out, such a resonator is very uneconomical for the user. The ultrasonic horn is made by precision machining, the unit cost thereof is very high.

SUMMARY OF THE INVENTION

Accordingly, it is an object of the present invention to provide a very economical, high-quality, and reliable resonator for use in an ultrasonic vibration bonding machine.

According to the invention there is provided a resonator for use in an apparatus for bonding workpieces with ultrasonic vibration, comprising an ultrasonic horn connected to a transducer for generating ultrasonic vibration, a bonding working portion, and a screw device movable in a direction perpendicular to the direction of the ultrasonic vibration to fix the bonding working portion to the ultrasonic horn so that the bonding working portion vibrates in the same manner as the ultrasonic horn, thus providing proper bonding with the ultrasonic vibrating.

When the bonding working portion is worn out, it is simply replaced with a new one without removing the ultrasonic horn from the resonator. Therefore, the resonator is very economical, high-quality, and reliable.

BRIEF DESCRIPTION OF THE INVENTION

DESCRIPTION OF THE PREFERRED EMBODIMENTS

Figure 1A:
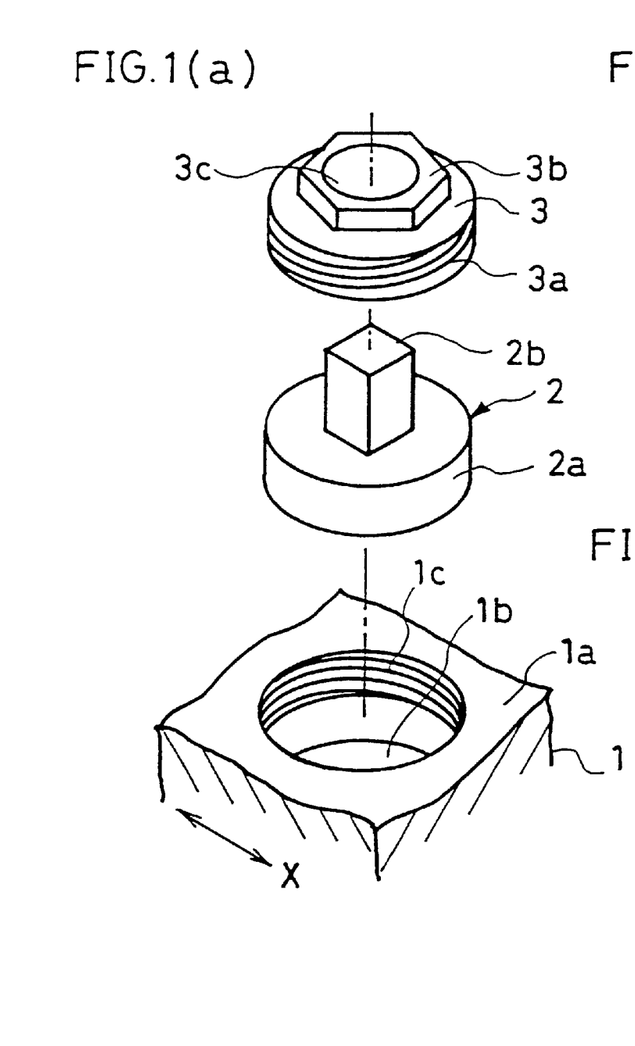
FIG. 1(a) is an exploded perspective view of a resonator according to the first embodiment of the invention.
Figure 1B:
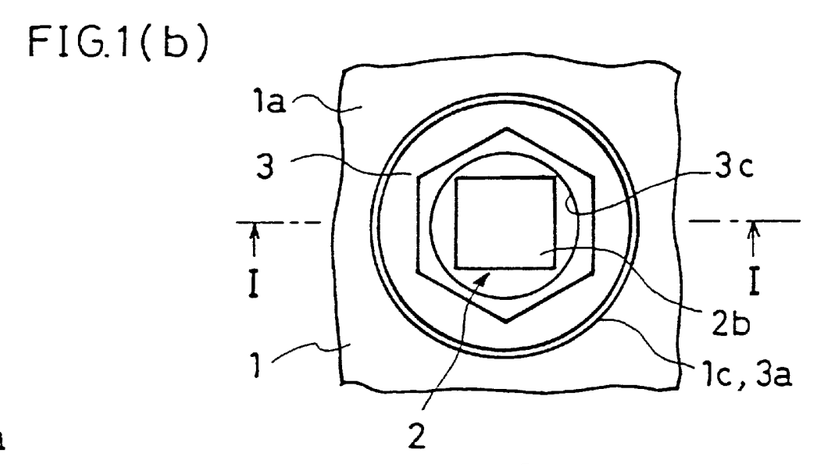
FIG. 1(b) is a plan view of the resonator.
Figure 1C:
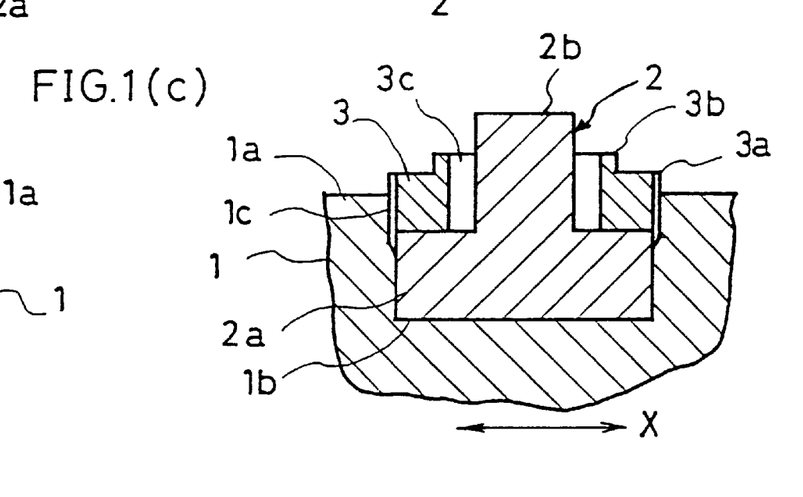
FIG. 1(c) is a sectional view taken along line 1(c)—1(c) of FIG. 1(b)

In FIGS. 1(a)–1(c), an ultrasonic horn 1 of a resonator is bar-shaped from aluminum, iron, titanium, or ceramic, and one end thereof is connected to a transducer with or without a booster. The transducer is formed of an electro-acoustic converter, such as a piezoelectric or magnetostrictive element, or an electric oscillation converter to generate vibration of a vertical ultrasonic wave having a predetermined frequency. The ultrasonic horn resonates with the ultrasonic vibration transmitted from the transducer and has a length equal to multiples of a half of the wavelength of the resonance frequency. A screw member 3 is screwed into the ultrasonic horn 1 for fixing a bonding working portion 2. The bonding working portion 2 is installed at a position corresponding to the maximum vibration point at an end of the ultrasonic horn 1 opposite to the transducer side if the ultrasonic horn 1 has a length of a half of the wavelength or at a position corresponding to the central maximum vibration point if the ultrasonic horn 1 has a length of the wavelength. The bonding working portion 2 is made in the form of a chip from aluminum, iron, or titanium as a separate unit from the ultrasonic horn 1. The screw member 3 is movable in a direction perpendicular to the vibration direction X of the ultrasonic horn 1. The bonding working portion 2 may be made from the same material as or a different material from that of the ultrasonic horn 1. The material of the bonding working portion 2 is determined by taking into consideration the material of workpieces.

The ultrasonic horn 1 is provided with a circular recessed portion 1b in the exterior surface 1a. The recessed portion 1b is provided with a threaded hole 1c near the exterior surface 1a to provide a female screw. The bonding working portion 2 consists of a disk-shaped chip base 2a which is fitted into the recessed portion 1b through the threaded hole 1c and a square pillar-like chip body 2b which is coaxial with the center axis of the recessed portion 1b and extends upwardly from the top surface of the chip base 2a. The chip base 2a has a thickness a little larger than the depth of a portion of the recessed portion 1b where the female screw is not formed. The chip body has a height larger than the thickness of the screw member 3. The screw member 3 has a screw portion 3a as a male screw to be mated with the female screw of the threaded hole 1c. A tool application portion 3b smaller than the screw portion 3a is formed on the top surface of the screw portion 3a, and a through hole 3c is formed in the center of the tool application portion 3b. The through hole 3c has a diameter large enough to prevent interference with the chip body 2b when the chip body 2a is stored in the recessed portion 1b and the screw member 3 is screwed into the threaded hole 1c.

The screw portion 3a of the screw or pressing member 3 is mated with the threaded hole 1c of the ultrasonic horn 1 in such a manner that the chip base 2a of the bonding working portion 2 is stored in the recessed portion 1b and the chip body 2b is inserted into the through hole 3c of the screw member 3. Then, a fastening tool, such as a spanner, is applied to the tool application portion 3b of the screw member 3 to fasten the screw member 3 to the ultrasonic horn 1 so that the chip body 2b projects from the through hole 3c of the screw member 3 while the chip base 2a is sandwiched between the lower surface of the screw member 3 and the bottom surface of the recessed portion 1b. That is, the bonding working portion 2 is fixed in the ultrasonic horn 1 with a screw device consisting of the threaded hole 1c and the screw portion 3a which is movable in a direction perpendicular to the vibration direction X so that it is pressed from above. In this state, the exterior peripheral surface of the chip base 2a is in contact with the interior peripheral surface of the recessed portion 1b, and the bottom surface of the chip base 2a is in contact with the bottom surface of the recessed portion 1b. Consequently, when the ultrasonic horn 1 resonates with ultrasonic vibration, the bonding working portion 2 vibrates in the same manner as the ultrasonic horn 1 without jumping in the recessed portion 1b, enabling proper ultrasonic bonding of workpieces.

When the bonding working portion 2 cannot be used any longer for repeated repairs by polishing the surface of the chip body 2a, the screw member 3 is loosened by applying the fastening tool to the tool application portion 3b to remove the old bonding working portion 2 from the recessed portion 1b of the ultrasonic horn 1. Then, a new bonding working portion 2 is fixed in the ultrasonic horn 1 with the screw member 3 so that the ultrasonic horn 1 can be used again. That is, the ultrasonic horn 1 whose resonance state has been tuned properly is not removed from the resonator and can be used again. Thus, an economical and reliable resonator having high quality is provided.

The recessed portion 1b may be provided with a tapered surface having a diameter which decreases as the distance from the top surface increases while the chip base 2a may be provided with a tapered surface which inclines in the same direction as the above tapered surface so that these tapered surfaces contact each other when the chip base 2a is pressed from above. Consequently, the bonding working portion 2 is prevented from jumping in the recessed portion 1b. The chip base 2a has a thickness slightly larger than the depth of a portion of the recessed portion 1b where no female screw is provided. Even if the thickness of the chip base 2a is made equal to or smaller than the depth of the portion, it is possible to fix the chip base 2a in the recessed portion 1b by forming a protrusion on the bottom surface of the screw member 3, which contacts the top surface of the chip base 2a.

Figure 2A:
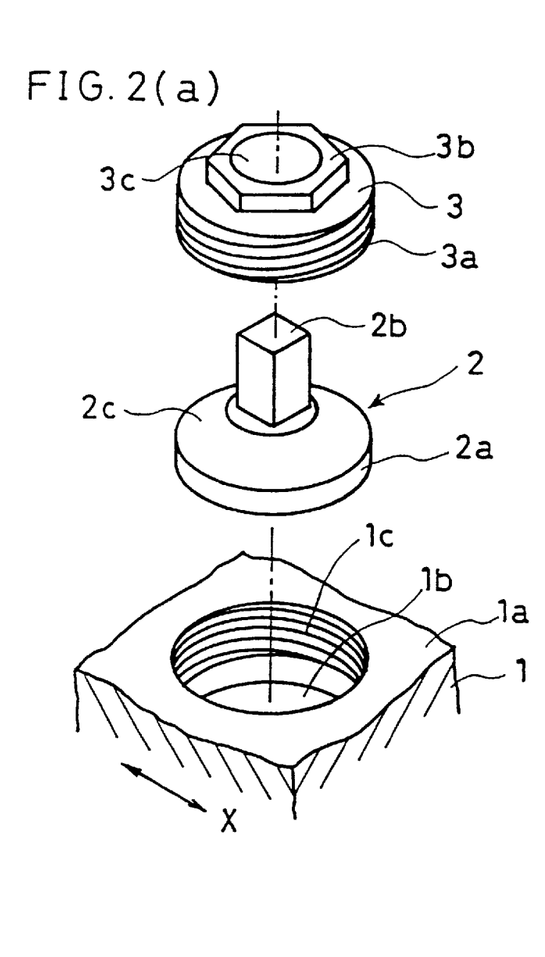
FIG. 2(a) is an exploded perspective view of a resonator according to the second embodiment of the invention.
Figure 2B:
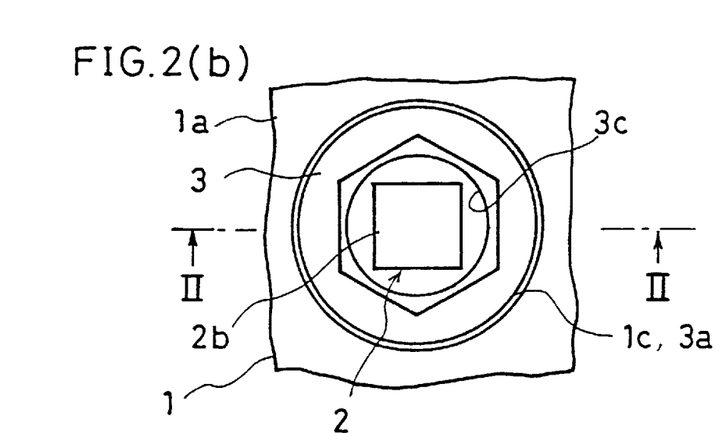
FIG. 2(b) is a plan view of the resonator of FIG. 2(a)
Figure 2C:
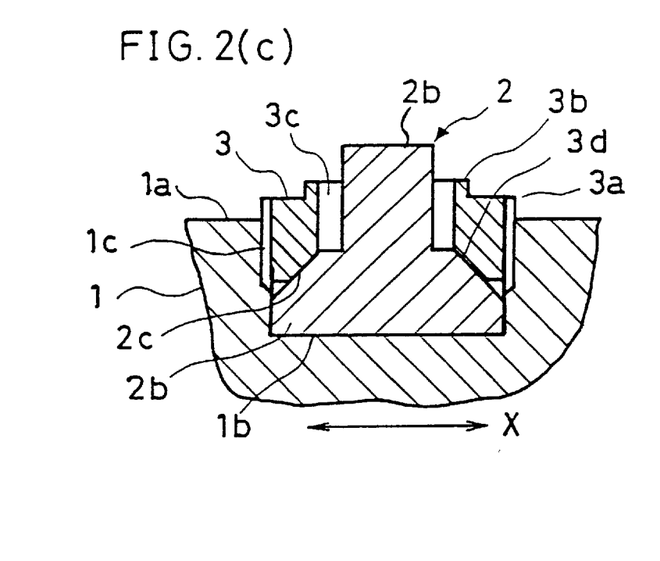
FIG. 2(c) is a sectional view taken along line 2(c)—2(c) of FIG. 2(b)

In FIGS. 2(a)–2(c), the chip base 2a of the bonding working portion 2 is provided with a headed conical surface 2c at the upper edge between the top surface and the side surface while the screw member 3 is provided with a headed conical hole portion 3d having an angle that matches the angle of the conical surface 2c at the lower edge between the bottom surface and the through hole 3c. Consequently, a wedge is formed by the conical surface 2c and the conical hole portion 3d when the bonding working portion 2 is fixed in the recessed portion 1b of the ultrasonic horn 1 with a screw device which consists of the threaded hole 1c and the screw portion 3a and is movable in the direction normal to the vibration direction X of the ultrasonic horn 1.

When the ultrasonic horn 1 resonates with ultrasonic vibration from the transducer, the wedge formed by the conical surface 2c and the conical hole portion 3d works as a bank against the vibration. That is, when the conical hole portion 3d is pressed against the conical surface 2c of the bonding working portion 2, the bonding working portion 2 cannot jump in the recessed portion 1b but vibrates in the same manner as the ultrasonic horn 1 even if it is not strongly fastened with the screw member 3. Thus, ultrasonic bonding can be carried out properly.

Figure 3A:
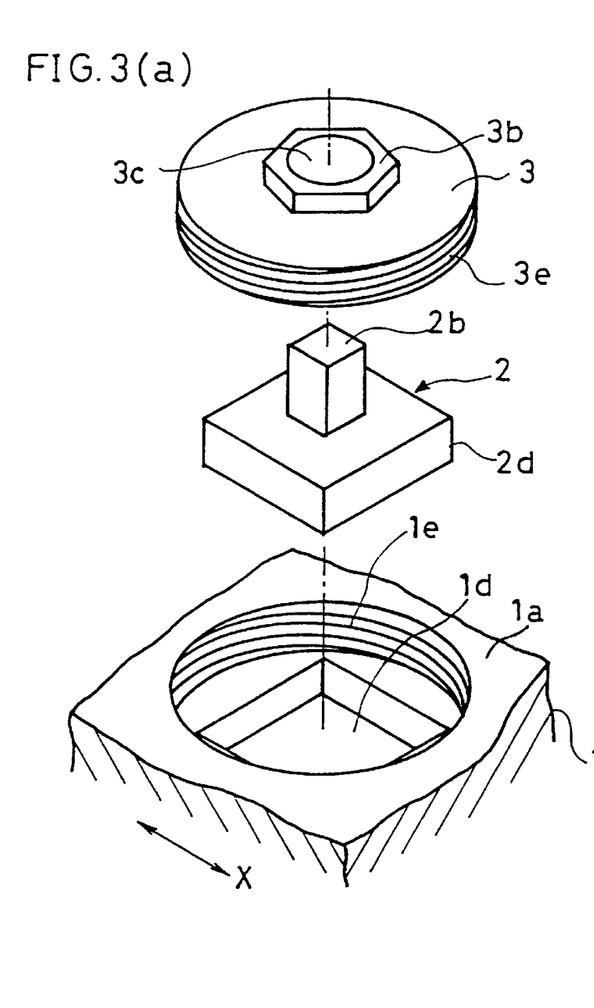
FIG. 3(a) is an exploded perspective view of a resonator according to the third embodiment of the invention.
Figure 3B:
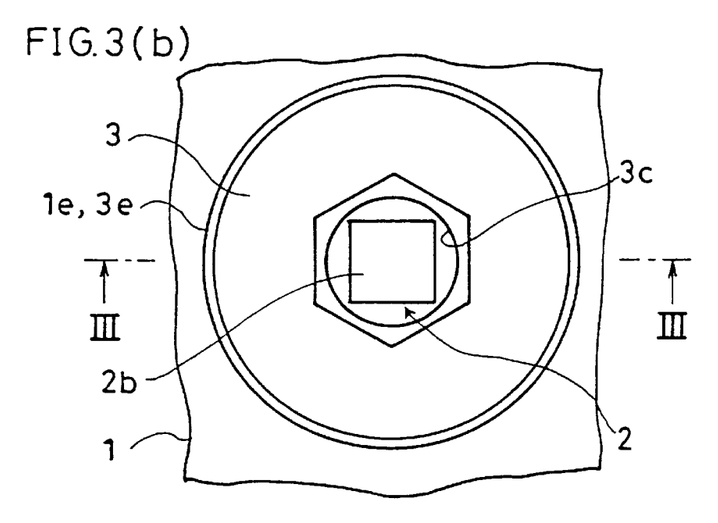
FIG. 3(b) is a plan view of the resonator.
Figure 3C:
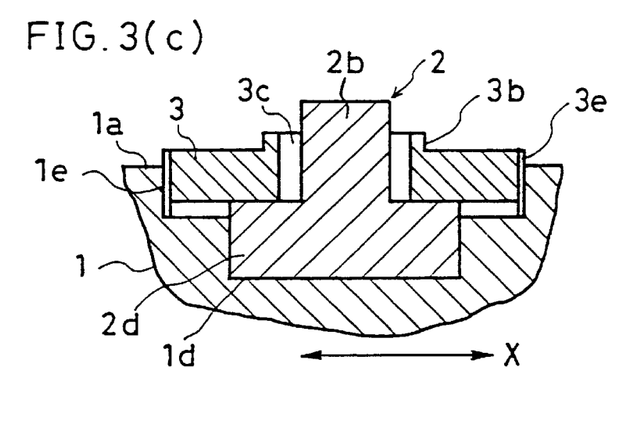
FIG. 3(c) is a sectional view taken along line 3(c)—3(c) of FIG. 3(b)

In FIGS. 3(a)–3(c), the ultrasonic horn 1 has a square recessed portion 1d and a threaded hole 1e extending downwardly from the exterior surface 1a and having a diameter larger than the recessed portion 1d and is coaxial with the recessed portion 1d. the bonding working portion 2 has a square pillar-like chip body 2b coaxial with a square plate-like chip base 2d which is fitted in the recessed portion 1d. The thickness of the chip base 2d is greater than the depth of the recessed portion 1d. The screw member 3 has a tool application portion 3b coaxial with a large diameter screw portion 3e which covers the chip base 2d of the bonding working portion 2, and a through-hole 3c in the center thereof.

The chip base 2d is mated with the recessed portion 1d through the threaded hole 1e, the screw portion 3e of the screw member 3 is mated with the threaded hole 1e of the ultrasonic horn 1 such that the chip body 2b is inserted into the through hole 3c of the screw member 3, and the screw member is fastened to the ultrasonic horn 1 so that the bonding working portion 2 is fixed in the ultrasonic horn 1 with the screw means consisting of the threaded hole 1e and the screw portion 3e which can advance or retreat in a direction perpendicular to the vibration direction X and vibrates in the same manner as the ultrasonic horn 1 without jumping in the recessed portion 1d. Thus, bonding with ultrasonic vibration is carried out properly.

The chip base 2d of the bonding working portion 2 and the recessed portion 1d of the ultrasonic horn 1 have substantially identical squire shapes so that the bonding working portion 2 can be positioned in the ultrasonic horn 1 accurately by placing the chip base 2d in the recessed portion 1d. When the top surface of the chip body 2d of the bonding working portion 2 is formed into a surface called "mesh" (a large number of ridges and recesses arranged accurately like mountains and valleys arranged continuously in one direction) or "blast" (a large number of ridges and recesses arranged at random), these ridges and recesses are arranged accurately at a predetermined angle with respect to the vibration direction X of the ultrasonic horn 1 to maintain the bonding strength of the workpieces.

Figure 4A:
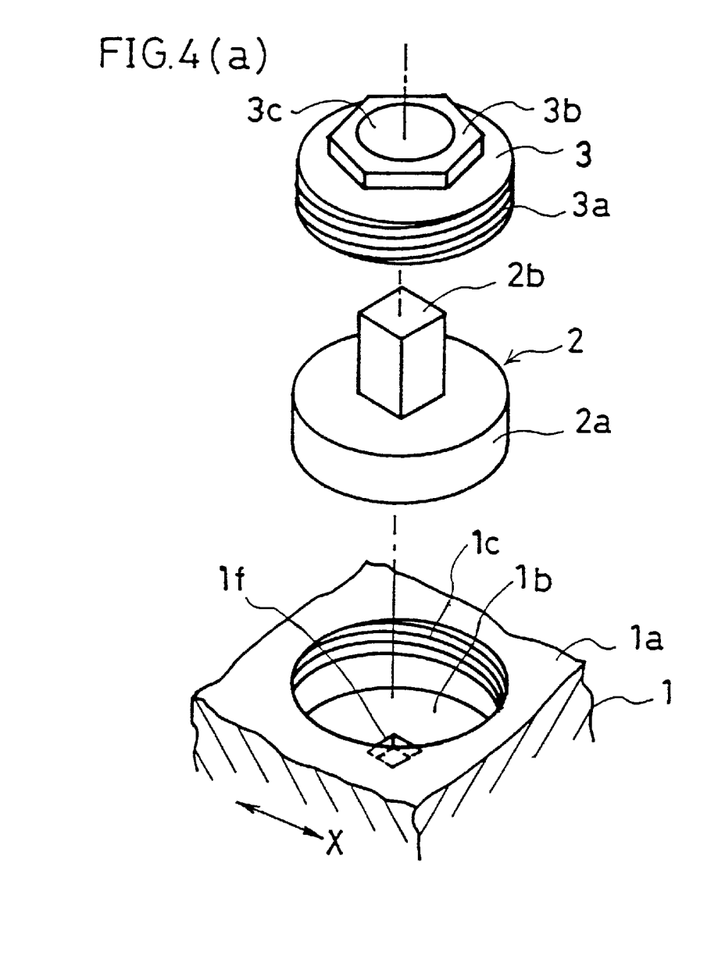
FIG. 4(a) is an exploded perspective view of a resonator according to the fourth embodiment of the invention.
Figure 4B:
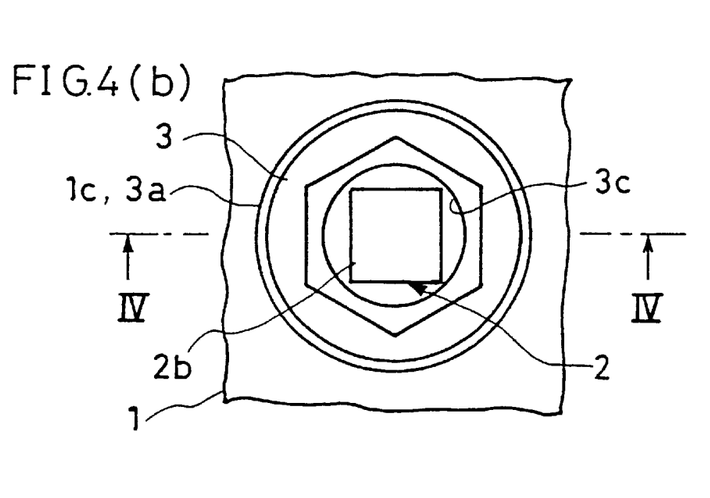
FIG. 4(b) is a plan view of the resonator of FIG. 4(a)
Figure 4C:
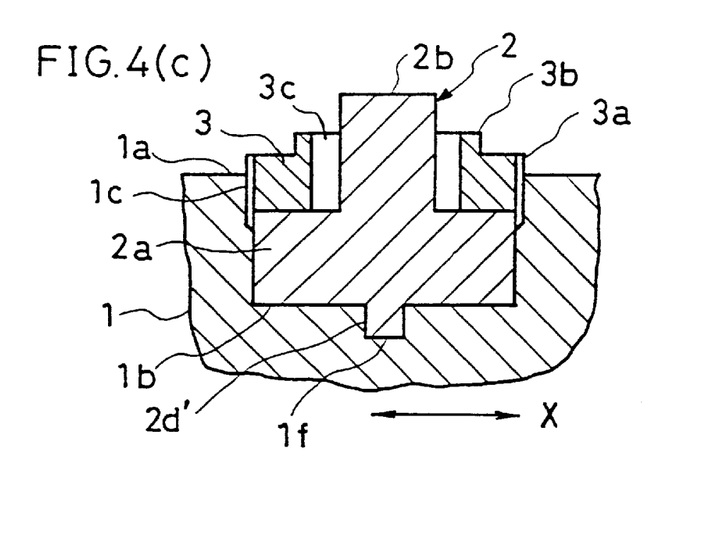
FIG. 4(c) is a sectional view taken along line 4(c)—4(c) of FIG. 4(b)

In FIGS. 4(a)–4(c), the ultrasonic horn 1 has a rectangular hole if in the bottom surface of the recessed portion 1b, which is coaxial with the recessed portion 1b. A projecting portion 2d' (FIG. 4(c)) is formed on the bottom surface of and coaxially with the chip base 2a and fitted in the rectangular hole 1f. The screw member 3 is fastened to the ultrasonic horn 1 so that the bonding working portion 2 is positioned with the screw means consisting of the threaded hole 1c and the screw portion 3a which is movable in a direction perpendicular to the vibration direction X.

Since the bonding working portion 2 is positioned in the ultrasonic horn 1 accurately by fitting the projecting portion 2d' into the rectangular hole 1f, the ridges and recesses of the bonding working portion 2 are arranged accurately at a predetermined angle with respect to the vibration direction X of the ultrasonic horn 1 to thereby maintain the bonding strength of the workpieces.

Figures 5A, 5B, 5C:
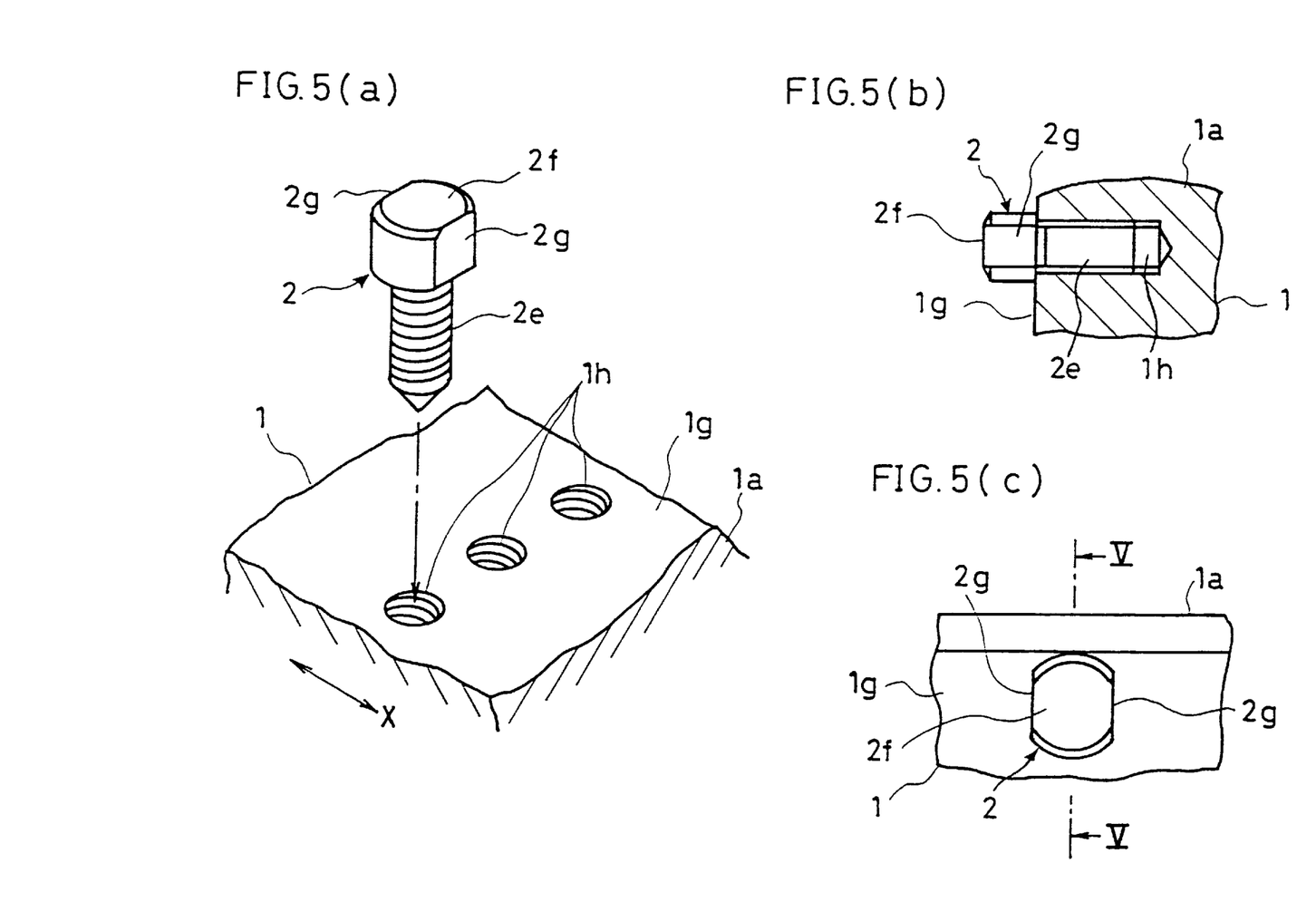
FIG. 5(a) is an exploded perspective view of a resonator according to the fifth embodiment of the invention.
FIG. 5(b) is a sectional view taken along line 5(b)—5(b) of 5(c)
FIG. 5(c) is a plan view of the resonator of FIG. 5(a)

In FIGS. 5(a)–5(c), the ultrasonic horn 1 has a flat surface portion 1g on the exterior surface 1a thereof which extends in parallel to the vibration direction X and a plurality of threaded holes 1h are formed in the flat surface portion 1g at predetermined intervals in a direction perpendicular to the vibration direction X. The bonding working portion 2 is shaped like the head of a screw consisting of a screw portion 2e as a male screw and a disk-shaped chip body 2f having a diameter larger than the screw portion 2e and connected to the screw portion 2e coaxially. The chip body 2f has a tool application portion 2g formed of a pair of opposed flat surfaces parallel to each other.

By applying a tool, such as a spanner, to the tool application portions 2g to screw the screw portion 2e of the bonding working portion 2 into the threaded hole 1h of the ultrasonic horn 1 until the head abuts against the flat surface portion 1g of the ultrasonic horn 1, the bonding working portion 2 is fixed in the ultrasonic horn 1 with the screw means, which consists of the screw portion 2e and the threaded hole 1h, so that it vibrates in the same manner as the ultrasonic horn 1. Thus, the ultrasonic bonding can be carried out properly.

A plurality of bonding working portions 2 are arranged in the ultrasonic horn 1 at predetermined intervals in a direction perpendicular to the vibration direction X by fastening the bonding working portions 2 to the threaded holes 1h.

Figures 6A, 6B, 6C:
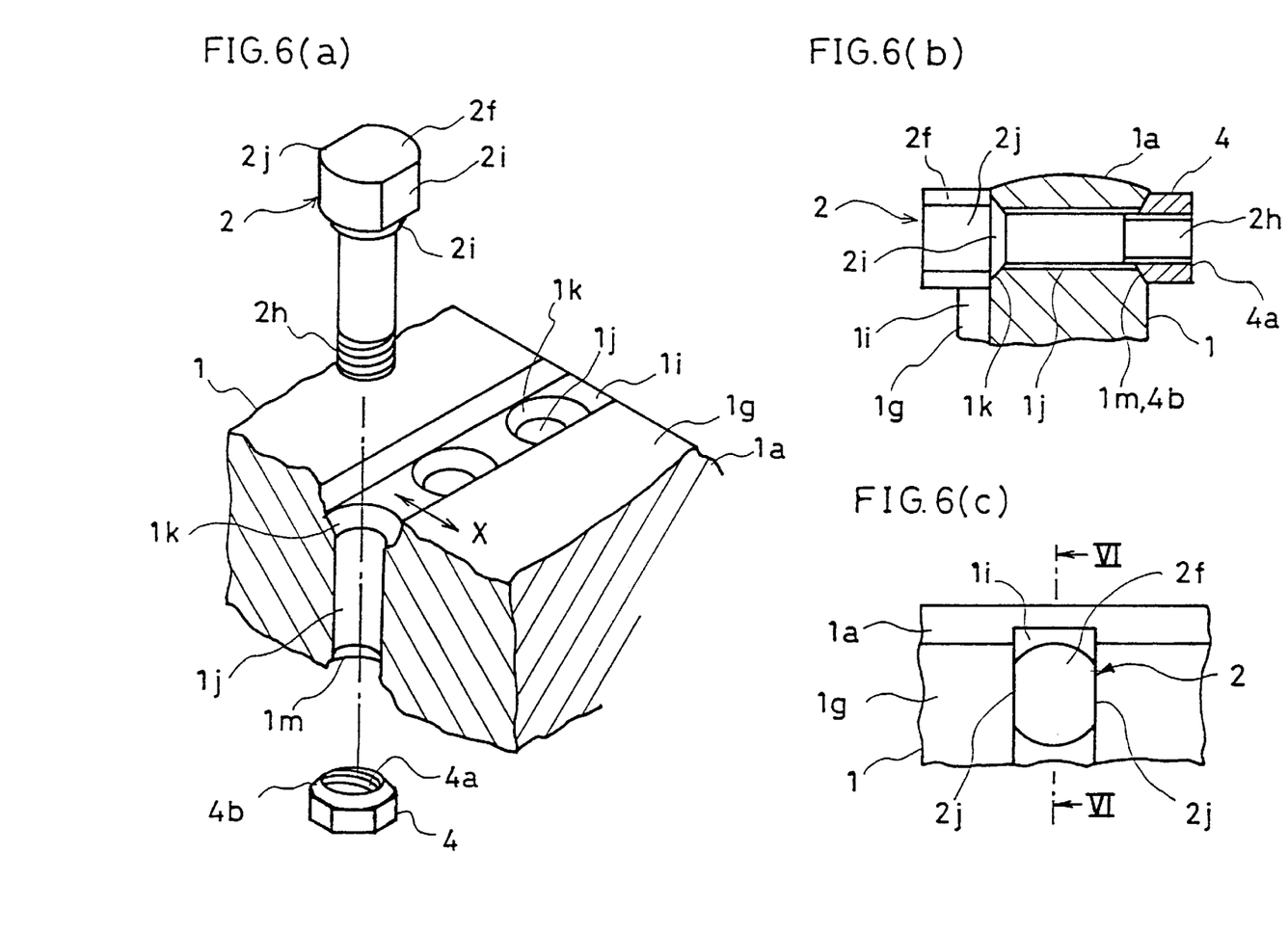
FIG. 6(a) is an exploded perspective view of a resonator according to the sixth embodiment of the invention.
FIG. 6(b) is a sectional view taken along line 6(b)—6(b) of FIG. 6(c)
FIG. 6(c) is a plan view the resonator of FIG. 6(a)

In FIGS. 6(a)–6(c), the ultrasonic horn 1 has, in the flat surface portion 1g thereof, a groove 1i which extends in a direction perpendicular to the vibration direction X. A plurality of through-holes 1j are formed in the bottom surface of this groove 1i at predetermined intervals in a direction perpendicular to the vibration direction X, and inclined surface 1k and 1m are formed at both end openings of each through-hole 1j. The bonding working portion 2 is shaped like a headed screw having a screw portion 2h, a conical surface 2i, and a ship body 2f, all of which are aligned coaxially. A pair of opposed flat surfaces 2j are spaced apart by substantially the same distance as the width of the groove 1i to form a rotation stop. A nut 4 has a conical surface 4b which matches the inclined surface 1k of the through-hole 1j.

When the bonding working portion 2 is inserted into the through-hole 1j of the ultrasonic horn 1, the rotation stop 2j of the chip body 2f is fitted into the groove 1i, and the screw portion 2h projects from the through-hole 1j. The nut 4 is then fastened with a fastening tool, such as a spanner, so that the inclined surface portion 2i of the bonding working portion 2 is brought into contact with the inclined surface 1k of the through-hole 1j, and the bottom surface of the chip body 2f and the inclined surface 4b of the nut 4 are brought into contact with the bottom surface of the groove 1i and the inclined surface 1m of the through-hole 1j, respectively. Thus, the bonding working portion 2 is fixed to the ultrasonic horn 1 with the screw means which consists of the screw portion 2h of the bonding working portion 2 and the threaded hole 4a of the nut 4 and is movable in a direction perpendicular to the vibration direction X.

Since the rotation stop 2j of the chip body 2f is fitted in the groove 1i when the nut 4 is fastened, the bonding working portion 2 is prevented from turning and fixed to the ultrasonic horn 1 precisely.

When the ultrasonic horn 1 resonates with ultrasonic vibration, wedges are formed by the inclined surfaces 1k and 2i and the inclined surfaces 1m and 4b to serve as a bank against the vibration, and the bonding working portion 2 vibrates in the same manner as the ultrasonic horn 1 without jumping even when the nut 4 is not tightened firmly. Thus, the ultrasonic bonding is carried out properly.

Figure 7A:
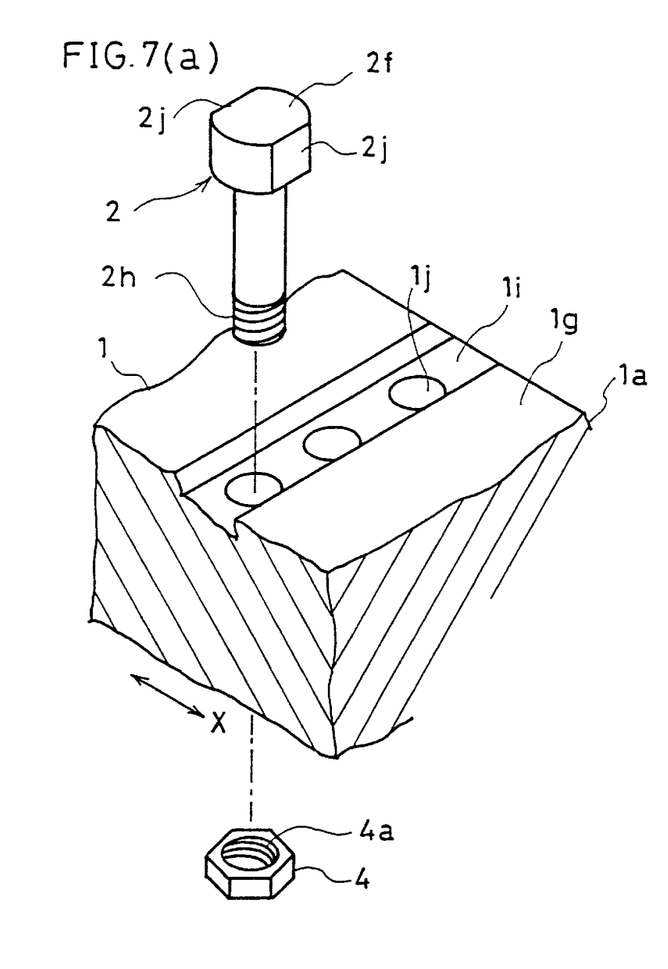
FIG. 7(a) is an exploded perspective view of a resonator according to the seventh embodiment of the invention.
Figures 7B, 7C:
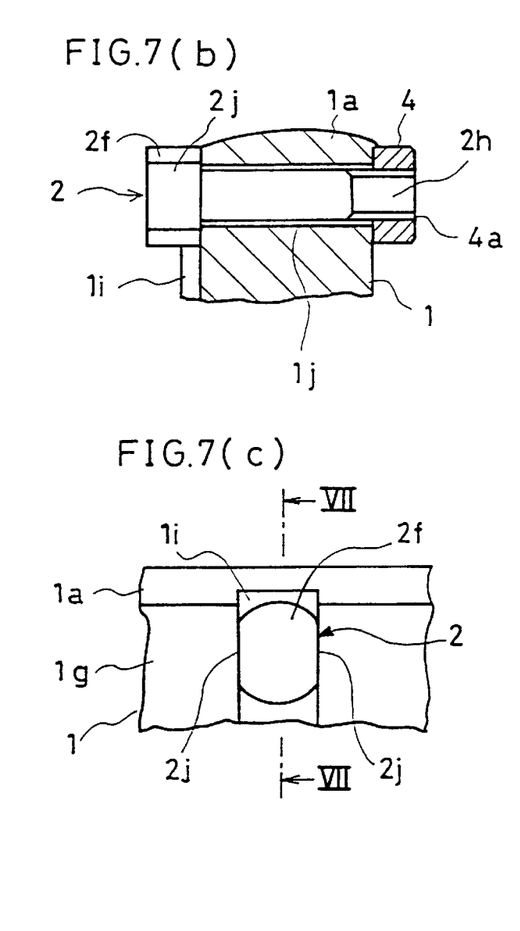
FIG. 7(b) is a sectional view taken along line 7(b)—7(b) of FIG. 7(c)
FIG. 7(c) is a plan view of the resonator of FIG. 7(a)

In FIGS. 7(a)–7(c), the bonding working portion 2 is fixed to the ultrasonic horn 1 by fastening the nut 4 to the screw portion 2h of the bonding working portion 2 while the bonding working portion 2 is prevented from rotating with the rotation stop 2i fitted in the groove 1i of the ultrasonic horn 1.

The bonding working portion 2 is fixed to the ultrasonic horn 1 by the screw means which consists of the screw portion 2h and the threaded hole 4a and movable in a direction perpendicular to the vibration direction X so that it vibrates in the same manner as the ultrasonic horn 1. Thus, the ultrasonic bonding is carried out properly.

Figure 8A:
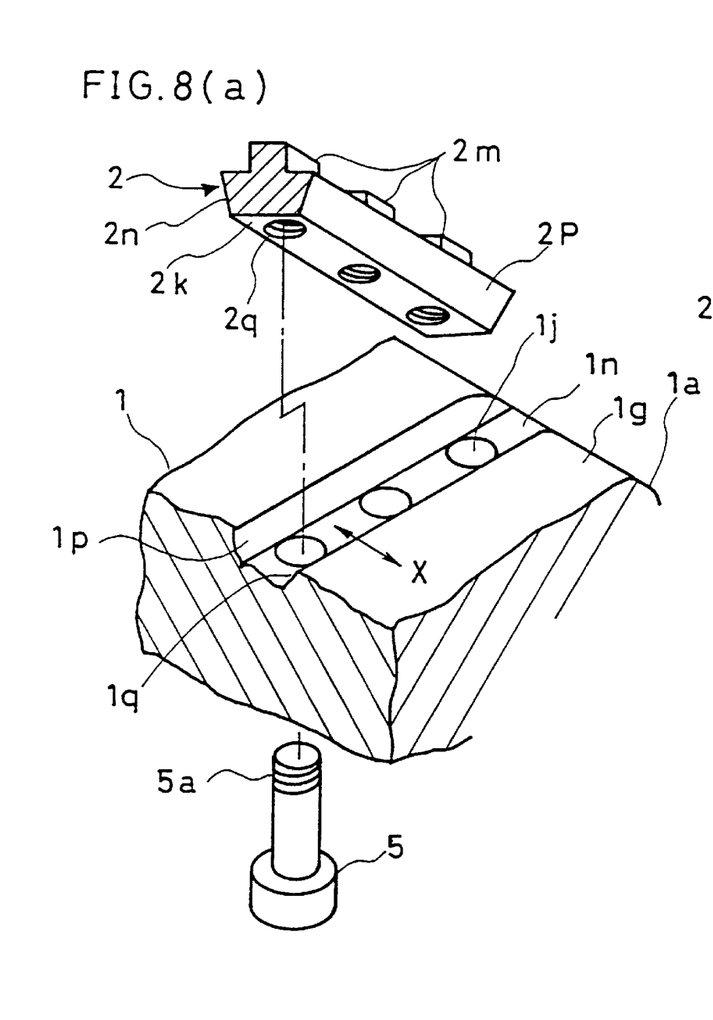
FIG. 8(a) is an exploded perspective view of a resonator according to the eighth embodiment of the invention.
Figure 8B:
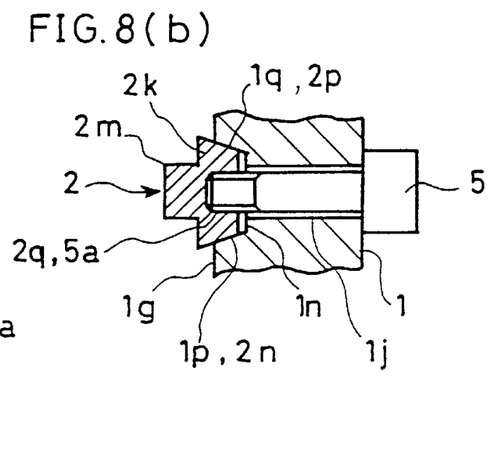
FIG. 8(b) is a sectional view taken along line 8(b)—8(b) of FIG. 8(c)
Figure 8C:
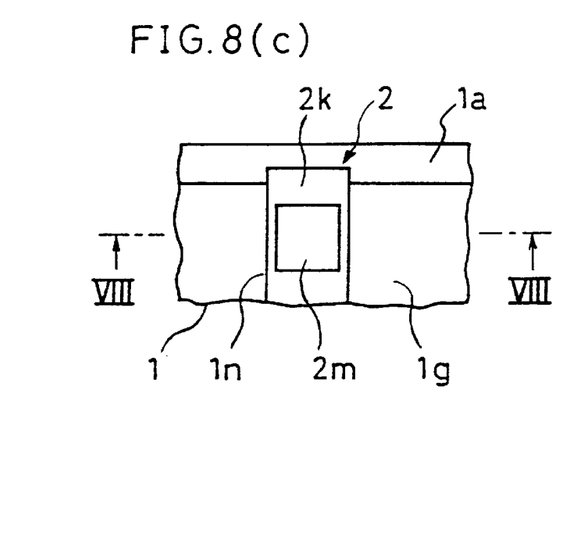
FIG. 8(c) is a plan view of the resonator of FIG. 8(a)

In FIGS. 8(a)–8(c), the ultrasonic horn 1 has, in the flat surface portion 1g, a mating groove in which extends in a direction perpendicular to the vibration direction X. The opposed side surfaces 1p and 1q of the mating groove in are inclined so that the interval between the side surfaces decreases from top to bottom of the mating groove 1n. A plurality of through-holes 1j are provided in the bottom of the mating groove 1n. The bonding working portion 2 has a band-shaped chip base 2k to be fitted in the mating groove in and a plurality of chip bodies 2m provided on the chip base 2k at predetermined intervals in a direction perpendicular to the vibration direction X. The opposed side surfaces 2n and 2p of the chip base 2k are inclined to match the inclined surface portions 1p and 1q of the mating groove 1n. A plurality of threaded holes 2q are provided in the bottom of the chip base 2k at positions corresponding to the through-holes 1j. A headed screw 5 is inserted into the through-hole 1j so that the screw portion 5a is mated with one of the threaded holes 2q.

When the chip base 2k of the bonding working portion 2 is inserted into the mating groove 1n of the ultrasonic horn 1, the screw member 5 is inserted into the through-hole 1j and screwed into the threaded hole 2q with a tool, such as a hexagonal wrench, so that the chip base 2k of the bonding working portion 2 is pulled into the mating groove 1n. Consequently, the inclined surface portions 2n and 2p of the chip base 2k are brought into contact with the inclined surface portions 1p and 1q of the mating groove 1n, respectively. Thus, the bonding working portion 2 is fixed to the ultrasonic horn 1 with the screw means which consists of the screw portion 5a and the threaded hole 2q and is screwed in a direction perpendicular to the vibration direction X so that the bonding working portion 2 vibrates in the same manner as the ultrasonic horn 1. Thus, the ultrasonic vibration is carried out properly.

In this embodiment, the separate chip bodies 2m are arranged on the chip base 2k but the same effect is obtained by forming the chip bodies 2m interconnected in a band form in a direction that the chip base 2k extends.

In FIGS. 9–16, the embodiments 9 to 16 employ the ultrasonic horns 1 of the embodiments 1 to 8, respectively.

Figure 9:
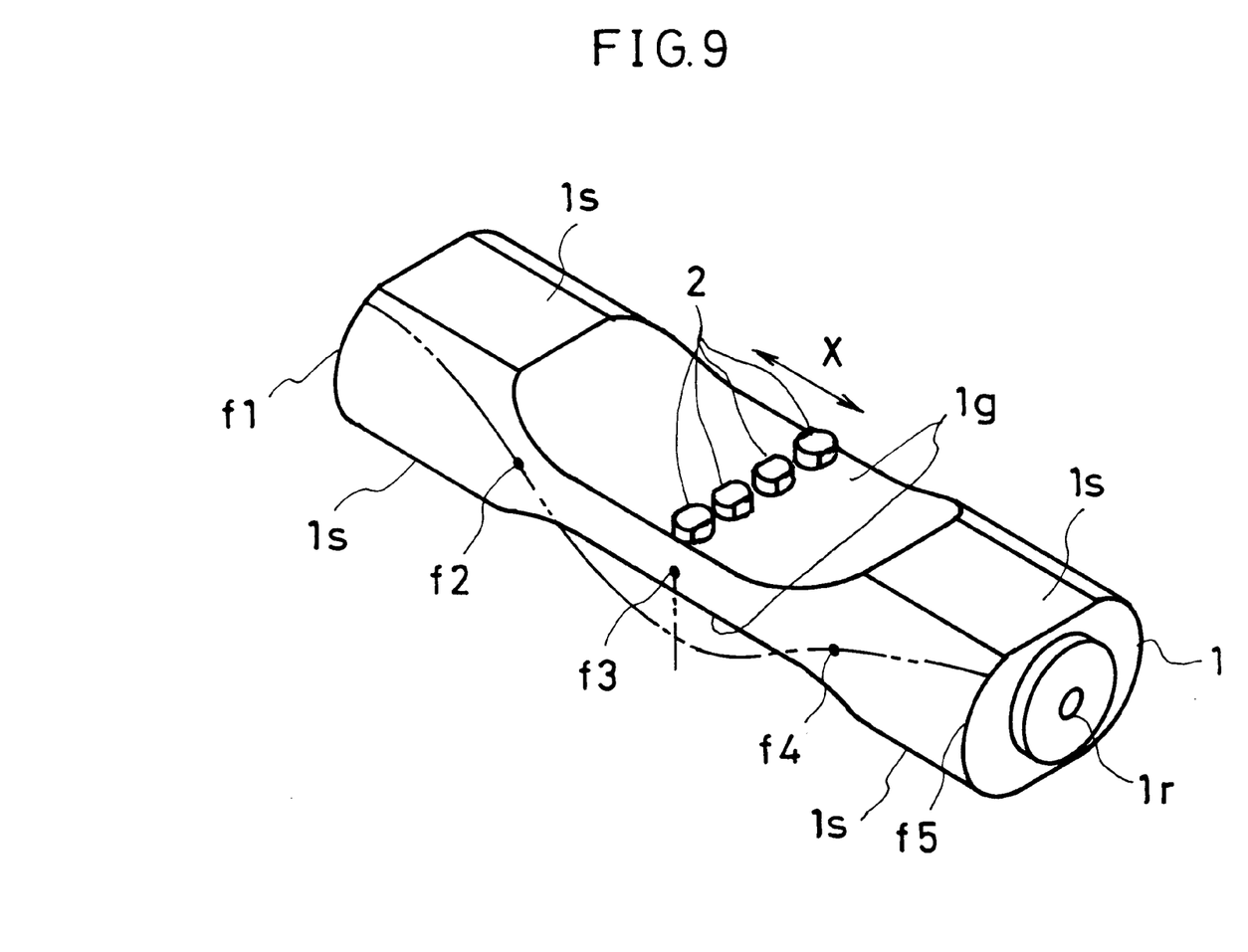
FIG. 9 is a perspective view of a resonator according to the ninth embodiment of the invention.

In FIG. 9, the ultrasonic horn 1 is supported at both ends and has a length equal to the wavelength of the resonance frequency and a pair of flat surface portions 1g parallel to each other, with the maximum vibration amplitude point f3 being at the center of the length. A plurality of the bonding working portions 2 fixed to the ultrasonic horn 1 with the screw means which consists of the threaded hole 1h and the screw portion 2e as shown in FIG. 5 such that the bonding working portions 2 are disposed in a row on one of the flat surface portions 1g at predetermined intervals in a direction perpendicular to the vibration direction X.

Figure 10:
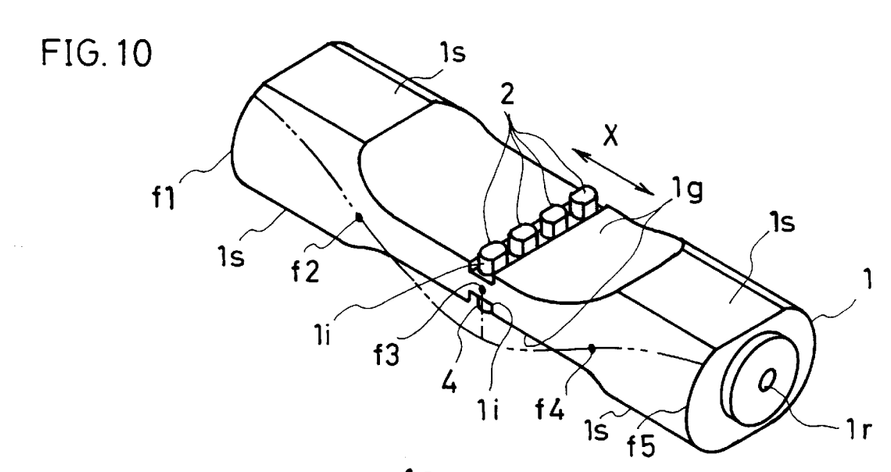
FIG. 10 is a perspective view of a resonator according to the 10th embodiment of the invention.

In FIG. 10, the ultrasonic horn 1 is supported at both ends and has a length equal to the wavelength of the resonance frequency and a groove 1i extending in a direction perpendicular to the vibration direction X on each of the flat surface portions 1g. The maximum vibration amplitude point f3 is at the center in the lengthwise direction of the ultrasonic horn 1. A plurality of the bonding working portions 2 are fixed to the upper groove 1i with the screw means which consists of the screw portion 2h and the threaded hole 4a as shown in FIG. 6 such that the bonding working portions 2 are disposed in a row on the upper groove 1i at predetermined intervals in the direction that the groove 1i extends. An inclined surface portion 1m (not shown) is formed on the lower groove 1i to match the inclined surface 4b of a nut 4 as shown in FIG. 6.

Figure 11:
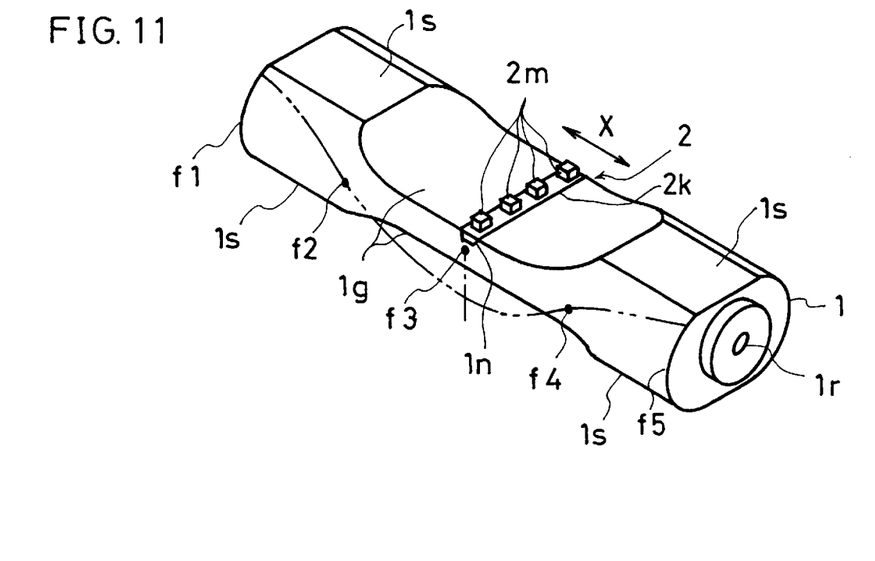
FIG. 11 is a perspective view of a resonator according to the 11th embodiment of the invention.

In FIG. 11, the ultrasonic horn 1 is supported at both ends and has a length equal to the wavelength of the resonance frequency and a mating groove 1n extending in a direction perpendicular to the vibration direction X in one of the pair of flat surface portions 1g. The maximum vibration amplitude point f3 is at the center of the horn in the lengthwise direction. The bonding working portion 2 is fixed in the mating groove 2n with the screw means consisting of the screw portion 5a and the threaded hole 2a as shown in FIG. 8 by inserting the chip base 2k of the bonding working portion 2 into the mating groove in and fastening it with the screw member 5.

Figure 12:
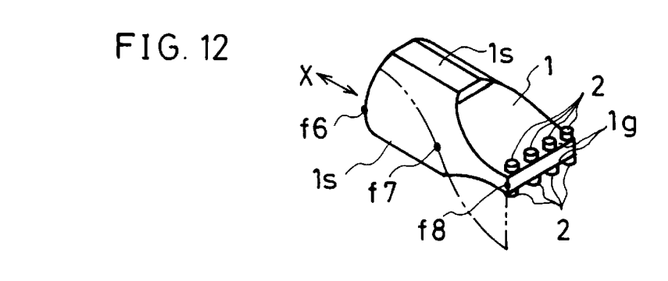
FIG. 12 is a perspective view of a resonator according to the 12th embodiment of the invention.

In FIG. 12, the ultrasonic horn 1 is supported at one end and has a length equal to a half of the wavelength of the resonance frequency, and a plurality of the bonding working portions 2 are fixed in the pair of flat surface portions 1g parallel to each other with the screw means consisting of the threaded hole 1h and the screw portion 2e as shown in FIG. 5 at the rectangular maximum vibration amplitude point f8 which is gradually narrowed from the minimum vibration amplitude point f7 such that they are disposed in a row at predetermined intervals in a direction perpendicular to the vibration direction X.

Figure 13:
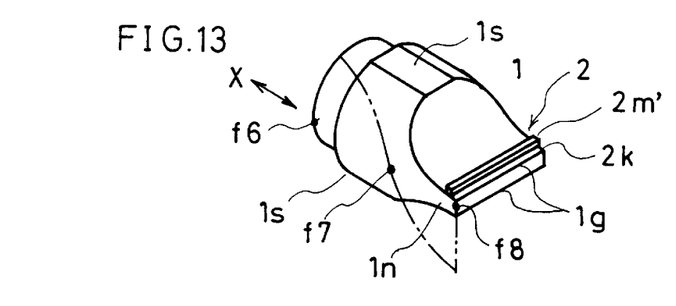
FIG. 13 is a perspective view of a resonator according to the 13th embodiment of the invention.

In FIG. 13, the ultrasonic horn 1 is supported at one end and has a length equal to a half of the wavelength of the resonance frequency and a mating groove 1n extending in a direction perpendicular to the vibration direction X in one of the pair of flat surface portions 1g parallel to each other at the rectangular maximum vibration amplitude point f8 which is narrowed gradually from the minimum vibration amplitude point f7, and the bonding working portion 2 is fixed in this mating groove in with the screw means consisting of the screw portion 5a and the threaded hole 2q as shown in FIG. 8 by inserting the chip base 2k of the bonding working portion 2 into the mating groove 1n and fastening it with the screw member 5. This bonding working portion 2 comprises a chip body 2m' in the form of a band extending in the same direction as the chip base 2k in place of the chip body 2m as shown in FIG. 8.

Figure 14:
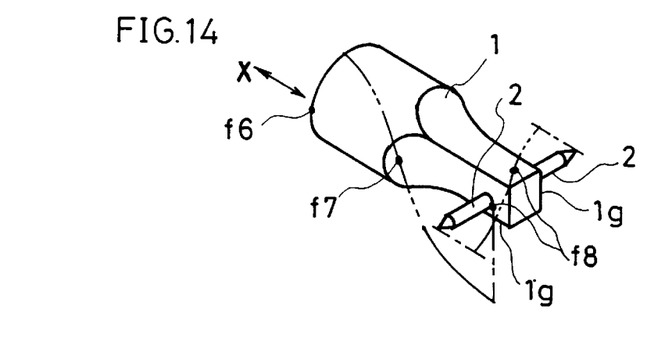
FIG. 14 is a perspective view of a resonator according to the 14th embodiment of the invention.

In FIG. 14, the ultrasonic horn 1 is supported at one end and has a length equal to a half of the wavelength of the resonance frequency. A pair of round bar-shaped bonding working portions 2 having pointed ends are fixed to a pair of opposed front and rear flat surface portions 1g with the screw means consisting of the screw portion 2e and the threaded hole 1h shown in FIG. 5 at the square pillar-shaped maximum vibration amplitude point f8 which is narrowed gradually from the minimum vibration amplitude point f7.

Figure 15:
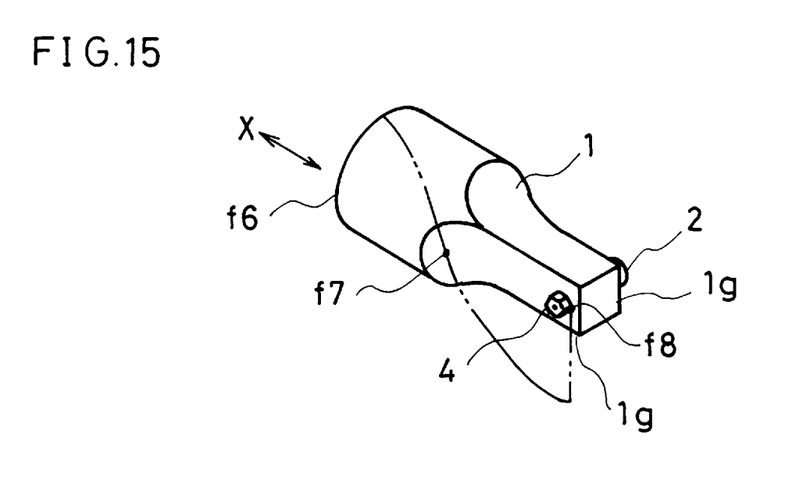
FIG. 15 is a perspective view of a resonator according to the 15th embodiment of the invention.

In FIG. 15, the ultrasonic horn 1 is supported at one end and has a length equal to a half of the wavelength of the resonance frequency. The bonding working portion 2 of FIG. 7 is fixed to the ultrasonic horn 1 through the pair of front and rear opposed flat surface portions 1g with screw means consisting of the screw portion 2h and the threaded hole 4a at the square pillar-shaped maximum vibration amplitude point f8 which is narrowed gradually from the minimum vibration amplitude point f7.

Figure 16:
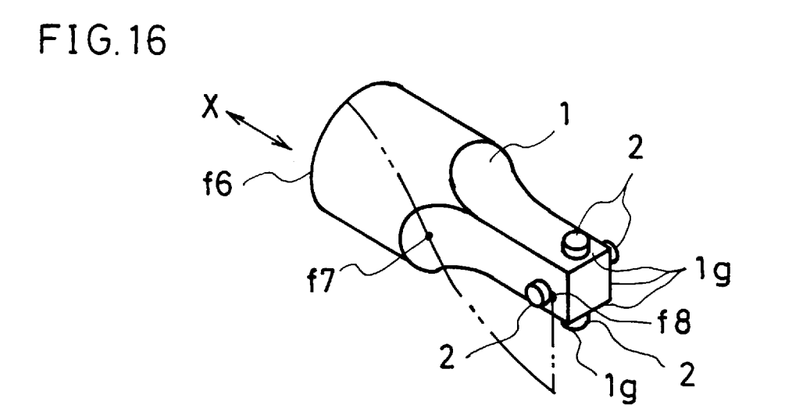
FIG. 16 is a perspective view of a resonator according to the 16th embodiment of the invention.

In FIG. 16, the ultrasonic horn 1 is supported at one end and has a length equal to a half of the wavelength of the resonance frequency. The bonding working portions of FIG. 5 are fixed in front, rear, upper and lower flat surface portions 1g of the ultrasonic horn 1 with screw means consisting of the screw portion 2e and the threaded hole 1h at the square pillar-shaped maximum vibration amplitude point f8 which is narrowed gradually from the minimum vibration amplitude point f7.

In the above embodiments 9 to 11, the ultrasonic horn 1 has threaded holes used to connect boosters or transducers. One of the threaded holes is denoted by 1r in the figures.

To fasten the ultrasonic horn 1 to boosters or transducers, a fastening tool is applied to flat surface portions is formed parallel to each other from the maximum vibration amplitude point f1 to the minimum vibration amplitude point f2 and from the minimum vibration amplitude point f4 to the maximum vibration amplitude point f5.

In the above embodiments 12 and 13, to fasten the ultrasonic horn 1 to an unshown booster or an unshown transducer, an unshown fastening tool is applied to flat surface portion is formed parallel to each other in a vertical direction from the maximum vibration amplitude point f6 to the minimum vibration amplitude point f7.

In the above Embodiments 12 to 16, the ultrasonic horn 1 has an unshown threaded hole used to connect an unshown booster or an unshown transducer in the center of the end surface at the maximum vibration amplitude point f6.

Further, in the above Embodiments 14 to 16, to fasten the ultrasonic horn 1 to an unshown booster or an unshown transducer, an unshown fastening tool is inserted into an unshown tool hole formed on the exterior peripheral surface of a columnar portion from the maximum vibration amplitude point f6 to the minimum vibration amplitude point f7.

According to the first aspect of the invention, a resonator used in an apparatus for bonding members to be bonded together with ultrasonic vibration is constructed by fixing a bonding working portion as a separate unit in an ultrasonic horn to be connected to a transducer to for generating ultrasonic vibration directly or indirectly through another member with screw means which can advance or retreat in a direction perpendicular to a vibration direction.

According to this invention, by fixing the bonding working portion in the ultrasonic horn with the screw means which can advance or retreat in a direction perpendicular to the vibration direction, the bonding working portion vibrates in the same manner as the ultrasonic horn so that bonding with ultrasonic vibration can be carried out properly. When the bonding working portion wears down, only this bonding working portion can be removed, repaired and re-fixed in the ultrasonic horn. In this case, without removing the ultrasonic horn, only the bonding working portion can be removed and repaired. As it is not necessary to remove the ultrasonic horn at this point, troublesome attachment and detachment of the ultrasonic horn can be eliminated, thereby making it possible to reduce the number of steps required for repair.

Even when the bonding working portion cannot be used any longer by repetitions of repair of surface polishing, the old bonding working portion can be replaced with a new one without removing the ultrasonic horn from the resonator and the ultrasonic horn whose resonance state is properly tuned can be reused. Therefore, this resonator can save costs and improve quality and reliability.

According to this invention, when the bonding working portion wears down to an extent that it requires conventional repair, it may be replaced with a new one without being repaired, thereby making it possible to eliminate labor and time required for a troublesome repair work.

According to this invention, since the bonding working portion is fixed by the screw means which can advance or retreat in a direction perpendicular to the vibration direction of the ultrasonic horn, the screw means is rarely loosened and the ultrasonic horn can be prevented from being separated from the ultrasonic horn by itself. In other words, since the bonding working portion is fixed in the ultrasonic horn by the screw means which can advance or retreat in a direction perpendicular to the vibration direction of the ultrasonic horn, it is possible to prevent the screw means from being loosened compared with a resonator in which screw means advances or retreats in the same direction as the vibration direction of the ultrasonic horn.

According to the second aspect of the present invention, the bonding working portion is pressed by a pressing member which is detachably mounted on the ultrasonic horn, it is possible to fix the bonding working portion in the ultrasonic horn with the pressing force of the pressing member without fail.

According to the third aspect of the present invention, since the bonding working portion is stored in the recessed portion, the displacement of the bonding working portion can be prevented by this recessed portion.

According to the fourth aspect of the present invention, since the bonding working portion is directly screwed into a threaded hole formed in the ultrasonic horn, another member is not required for attaching the bonding working portion to the ultrasonic horn, thereby reducing costs for attaching the bonding working portion.

According to the fifth aspect of the present invention, since the bonding working portion is fixed in the ultrasonic horn with a screw portion formed in the bonding working portion and a nut to be mated with the screw portion, the bonding working portion can be attached to the ultrasonic horn by the fastening force of the nut without fail.

According to the sixth aspect of the present invention, since a plurality of bonding working portions are prepared, bonding at a plurality of spots is possible. Also in this case, each of bonding working portions can be replaced with a new one individually, thereby reducing costs.

According to the seventh aspect of the present invention, since the plurality of the bonding working portions are formed on a single substrate which is detachable from the ultrasonic horn, the plurality of bonding working portions can be replaced simply by substituting this substrate with a new one.

According to the eighth aspect of the present invention, since the substrate is formed like a band and the bonding working portions are arranged in a row on this band-form substrate, locations to be bonded with the bonding working portions can be arranged on a straight line.

What is claimed is:

1. A resonator for an apparatus having a transducer for bonding workpieces with ultrasonic vibration, comprising:
    an ultrasonic horn which is to be connected to said transducer for generating ultrasonic vibration and has a recessed portion in an exterior surface thereof at a maximum vibration amplitude point and a threaded portion provided on an upper part of said recessed portion;
    a bonding working portion having a chip base fitted in said recessed portion and a chip body provided on said chip base; and
    a screw member movable in a direction perpendicular to a vibration direction of said ultrasonic vibration and having a screw portion to fit into said threaded portion and a through-hole through which said chip body is put without contact with said screw member so that when said screw portion is screwed into said threaded portion, said bonding working portion is fixed to said ultrasonic horn by said screw member at the maximum vibration amplitude point of said ultrasonic horn such that a front end of said chip body projects through said through-hole and contacts a workpiece while said chip base is held between said screw member and a bottom of said recessed portion.

2. A resonator according to claim 1, wherein said screw member is provided with a tool application portion around said through-hole.

3. A resonator according to claim 1, wherein said chip base is provided with a first inclined surface at an upper circumferential edge thereof and said screw member is provided with a second inclined surface at a lower edge of said through-hole such that said first and second inclined surfaces have equal inclination angles.

4. A resonator according to claim 1, wherein said recessed portion has a square bottom shape with its diagonal distance smaller than a diameter of said threaded portion and said chip base has a square shape to be fitted in said square chip base.

5. A resonator according to claim 1, wherein said recessed portion is provided with a rectangular hole in a bottom thereof and said chip base is provided with a rectangular projection on a bottom thereof such that said rectangular projection is fitted in said rectangular hole for facilitating positioning said bonding working portion.

6. A resonator for an apparatus having a transducer for bonding workpieces with ultrasonic vibration, comprising:

an ultrasonic horn which is to be connected to said transducer for generating ultrasonic vibration and has a recessed portion in an exterior surface thereof at a maximum vibration amplitude point and a through-hole provided on a bottom of said recessed portion;

a bonding working portion having at least one chip body fitted in said recessed portion such that a front end of said chip body projects from said exterior surface for contact with a workpiece and at least one screw portion extending downwardly from a bottom of said chip body and through said through-hole; and a screw member movable in a direction perpendicular to a vibration direction of said ultrasonic vibration and having a threaded hole therein so that when said strew member is screwed to said screw portion, with the front end of said chip body projects from said ultrasonic horn.

7. A resonator according to claim 6, wherein said through-hole of said ultrasonic horn is provided with a first inclined surface at a lower edge thereof and said screw member is provided with a second inclined surface at an upper edge thereof such that said first and second inclined surfaces have equal inclination angles.

8. A resonator according to claim 6, wherein said through-hole of said ultrasonic horn is provided with a first inclined surface at an upper edge thereof and said chip body is provided with a second inclined surface at a junction with said screw portion such that said first and second inclined surfaces have equal inclination angles.

9. A resonator according to claim 6, wherein said chip body is provided with a pair of flat rotation-stop side faces so that when said chip body is fitted in said recessed portion, said side faces abut against side walls of said recessed portion.

10. A resonator for an apparatus having a transducer for bonding workpieces with ultrasonic vibration, comprising:

an ultrasonic horn which is to be connected to said transducer for generating ultrasonic vibration and has a recessed portion in an exterior surface thereof at a maximum vibration amplitude point and at least one through-hole provided on a bottom of said recessed portion, said recessed portion having a pair of first inclined side faces, between which a distance decreases as a depth of said recessed portion increases;

a bonding working portion having a chip base fitted in said recessed portion and at least one chip body provided on said chip base so that a front end thereof projects from said exterior surface of said ultrasonic horn for contact with a workpiece, and at least one threaded hole provided in a bottom of said chip base, said bonding working portion having a pair of second inclined side faces to match said first inclined side faces; and a screw member movable in a direction perpendicular to a vibration direction of said ultrasonic vibration and having a head portion and a screw portion to fit into said threaded portion of said bonding working portion to bring said first and second inclinded surfaces together to thereby fix said bonding working portion to said ultrasonic horn with a gap between said bottoms of said chip base and said recessed portion.

11. A resonator according to claim 10, wherein a plurality of said chip bodies are interconnected at an area where they are fitted in said recessed portion.

12. A resonator according to claim 10, wherein said chip base is an elongated plate that fits in said recessed portion and a plurality of chip bodies provided on top of said chip base.

* * * * *